United States Patent [19]
Kallenberger

[11] Patent Number: 5,347,880
[45] Date of Patent: Sep. 20, 1994

[54] METHOD AND APPARATUS FOR SERVICING A GEAR ASSEMBLY

[75] Inventor: Harvey J. Kallenberger, Wind Lake, Wis.

[73] Assignee: Harnischfeger Corporation, Brookfield, Wis.

[21] Appl. No.: 980,365

[22] Filed: Nov. 23, 1992

[51] Int. Cl.$^5$ .................. F16H 55/12; D02J 3/14; B23P 19/04
[52] U.S. Cl. ............................ 74/447; 74/448; 29/893; 29/402.08; 29/239
[58] Field of Search ............... 29/893, 239, 402.03, 29/402.08; 74/447, 448

[56] References Cited
U.S. PATENT DOCUMENTS

| | | | |
|---|---|---|---|
| 914,071 | 11/1908 | Porter | 74/448 |
| 1,506,642 | 8/1924 | Iler | 74/448 |
| 3,888,357 | 6/1975 | Bauer et al. | 74/448 |
| 4,111,064 | 9/1978 | Purcell | 74/448 |

Primary Examiner—P. W. Echols
Attorney, Agent, or Firm—Jansson & Shupe, Ltd.

[57] ABSTRACT

An aspect of the invention is an improved method for servicing a gear assembly having a gear segment and a spider for supporting the segment. The method includes the steps of providing a jack assembly with a jacking bolt mounted for radial outward movement, moving the jacking bolt radially outward, applying a separating force to the segment and disengaging the segment from the spider. Further steps involve providing a drawtight assembly with a coupler attached to the segment, applying a force to the coupler, moving the coupler radially inward and engaging the segment with the spider. Other aspects of the invention include the "jacking" apparatus for separating a segment from the spider (for service purposes) and the "drawtight" apparatus for re-attaching the segment to the spider. The invention is particularly useful in connection with large machinery, e.g., a walking dragline, involving heavy and/or unevenly-wearing gear parts and difficult field service conditions.

15 Claims, 6 Drawing Sheets

METHOD AND APPARATUS FOR SERVICING A GEAR ASSEMBLY

Field of the Invention

This invention is related generally to machinery and, more particularly, to machinery having a spider-and-segment type gear assembly.

Background of the Invention

Machinery powered by electric motors or internal combustion engines (typically referred to as "prime movers") often use gears, shafts and the like to form what is referred to as a drive train providing power to perform an end-use function. Automobiles, metal cutting and shaping machines, toggle-type presses and construction and earth-moving machines are but a few examples of such machinery.

As more specific examples, such machinery drive trains uses gears and shafts in speed reducers to reduce speed (from that of the motor or engine output shaft) and increase torque and/or to change the direction of power flow. Shafts interconnect "stages" of gearing or connect a final gearing stage to an output device such as automobile wheels, press head or, in the case of an earth-moving machine known as a walking dragline, to a "walk leg" drive.

In such machines, the drive train components (gears, shafts and the like) range in size from a few pounds to several thousand pounds. Another characteristic of certain types of machines, e.g., toggle presses and walking draglines, is that certain machine functions tend to load (and wear) drive train components unevenly. For example, the drive train of a toggle press (especially that portion driving the toggle press head mechanism) is most heavily loaded over only that fraction of a revolution relating to the final, piece-forming part of the press stroke. In a walking dragline, the walk leg drive is most heavily loaded only during that part of a revolution, nominally about 120° or less, during which the dragline is being lifted to take a "step". To keep the machine functioning efficiently and in condition to satisfactorily perform its task, worn parts need to be replaced or repaired. However, with larger machines, maintenance and parts replacement can be an imposing challenge, especially if the parts are large and unwieldly. Nowhere is this more true than in large mobile machines such as earth-moving and earth-excavating machinery.

Such machinery is available in a wide variety of types ranging from the familiar rubber-tire mounted and crawler-mounted to the less-common dragline. The invention is described in connection with an exemplary dragline. A dragline is often used for removing top soil and "overburden" to expose a valuable mineral, e.g., coal, beneath but near the earth's surface. Draglines are equipped with an angularly-extending boom from which is suspended a "bucket" having an open mouth and digging teeth, both pointing toward the main portion of the machine.

Overburden is removed by placing the bucket on the ground at a point distant from the machine and pulling it toward the machine, filling the bucket in the process. Once filled, the machine pivots about a central axis and the bucket emptied at a spoil pile somewhat away from the area being excavated.

Smaller draglines are crawler mounted (much like a military tank) and capable of movement in the same way albeit at much slower speeds. However, as draglines (and their digging buckets) increased in size, crawler mounting was found to be impractical and in the early 1900's, the "walking" dragline was developed. The walking dragline is so named because it takes short "steps" and uses a "walk leg" mechanism (which resembles a human leg) to do so. A difference is that in a walking dragline, both legs step simultaneously.

To give some perspective to the following discussion, an exemplary large walking dragline—made by Harnischfeger Industries of Milwaukee, Wis.—has a main housing portion (including the machinery deck, operator's cab and the like) which is about 105 feet long, about 80 feet wide, about 40 feet high and weighs about nine million pounds. The boom extends about 300 feet and the capacity of the digging bucket is about 80 cubic yards. The walk legs of such dragline take steps about seven feet in length. For reasons that will become apparent, the arrangement of such exemplary dragline and the sheer weight of its components prohibits or at least impedes easy repair.

An invention facilitating expedited, relatively easy servicing of a drive train gear component would be an important advance in the art.

Objects of the Invention

It is an object of this invention to provide an improved apparatus and method for servicing a gear assembly which overcomes some of the problems and shortcomings of the prior art.

Another object of this invention is to provide an improved apparatus and method for servicing a gear assembly wherein the means for removing and re-engaging a gear segment are part of the assembly.

Another object of this invention is to provide an improved apparatus and method for servicing a gear assembly wherein parts can be readily disengaged and re-engaged notwithstanding relatively high motion-resisting frictional forces.

Yet another object of this invention is to provide an improved apparatus and method for servicing a gear assembly wherein the dead weight of a segment can be lifted during segment re-engagement.

How these and other important objects are accomplished will be apparent from the following descriptions and from the drawing.

Summary of the Invention

Broadly described, the invention is useful in connection with geared machinery drive applications where the gears are very heavy and are subjected to loads resulting in uneven gear tooth wear. More specifically, the invention finds particular utility in field servicing such geared drives of the type having a gear assembly made of a spider and at least one gear segment. The invention is described in connection with a spur gear assembly which is round, i.e., shaped like a disc, and which has a web-like, generally circular spider with plural arc-like gear segments mounted around the circumferential perimeter of the spider.

An aspect of the invention involves an improved method for servicing such a gear assembly. In the field, such activity first involves disengaging a segment from a spider. Accordingly, the method includes the steps of providing a jack assembly with jacking means (a bolt, hydraulic cylinder or the like) mounted for radial movement. The jacking means is moved radially outward, applies a separating force to the segment and disengages the segment from the spider.

In another aspect of the invention (related to disengagement of a segment from a spider), the segment is arc-shaped, has ends and is attached to the spider by a plurality of fasteners spaced along the length of the segment. The preferred method includes, in either order with respect to the providing step, the step of removing all but a single fastener from the segment so that the single remaining fastener is adjacent to a segment end. The disengaging step is preceded by the step of pivoting the segment about the single remaining fastener so that the end of the segment opposite the remaining fastener can be dropped (or lifted) away from the spider.

In a highly preferred method, the jack assembly includes a first force reaction member such as a plate extending axially between the spaced webs of the spider. The separating force is applied between the reaction member and the segment and urges the segment radially outward for segment-spider disengagement. Where the jacking means includes a bolt, force application is by rotating the bolt to move the bolt radially outward. More specifically, the segment includes a push plate and the separating force is applied between the reaction member and the push plate.

The segment includes a segment mounting member for attaching the segment to the spider and such mounting member has a first surface. The spider has a second surface and the disengaging step includes disengaging the surfaces from one another. For better durability, mounting of the segment on the spider is preferably by attaching the segment to the spider using an arrangement resembling tongue-and-groove construction. With such configuration, the surfaces are disengaged from one another by sliding the first surface along the second surface.

After segment repair or replacement is effected, the gear assembly must be put back together for service. Therefore, the method further includes the steps of providing a drawtight assembly for drawing the segment tightly against the spider. The assembly has a coupler attached to the segment and gear re-assembly is by applying a force to the coupler, moving the coupler radially inward and fully engaging the segment with the spider.

In an exemplary arrangement, the drawtight assembly includes a draw plate and a coupling bolt. The preferred method includes applying the force to urge the coupler toward the draw plate and the moving step includes rotating the coupling bolt to move the segment radially inward until it is fully "seated" on the spider. In the aforedescribed tongue-and-groove arrangement, the segment has a segment mounting member, the spider has a surface and the engaging step includes sliding the mounting member along the surface.

Another aspect of the invention involves the apparatus used to "jack" the segment away from the spider. The improved gear assembly has a segment-attached mounting member and a spider-mounted jack assembly with jacking means. The jacking means, e.g., a bolt, is mounted for radial movement to engage the mounting member and apply radial force thereto to disengage the segment from the spider. In one highly preferred arrangement, the mounting member includes spaced support plates and the spider includes spaced webs, each of which abuts a separate support plate. A push plate is attached to the support plates and is engaged by the jacking means for disengaging the segment from the spider.

Yet another aspect of the invention, used in re-assembly, involves the apparatus to draw the segment tightly to the spider.

The improved gear assembly has a segment-mounted coupler and a spider-mounted drawtight assembly. The drawtight assembly includes drawdown means (a bolt and nut or the like) to engage the coupler, apply radial force to it and engage the segment with the spider. In a highly preferred arrangement, the segment includes spaced support plates and the coupler is attached to such support plates, the spider includes spaced webs (and each web abuts a separate support plate) and the drawdown means includes a drawdown bolt rotated to move the segment radially inward.

Other details of the invention are set forth in the following detailed description and the drawing.

Detailed Descriptions of the Preferred Embodiments

Before describing the preferred embodiments, it should be appreciated (and persons of ordinary skill will appreciate) that the improved apparatus 10 and method are applicable to stationary mounted "in-factory" machines and to mobile machinery. This specification describes aspects of a segmented gear. While segmented gears per se are known, the claimed gear assembly and the method of servicing a segmented gear in the manner claimed is, insofar as is known, new. The invention clearly offers convenience in machines of moderate size and becomes more compelling as the size of the machine increases. To help "dramatize" and emphasize this fact, the invention is disclosed in connection with one of the largest types of machines in the world, a walking dragline 11.

Figure 1:
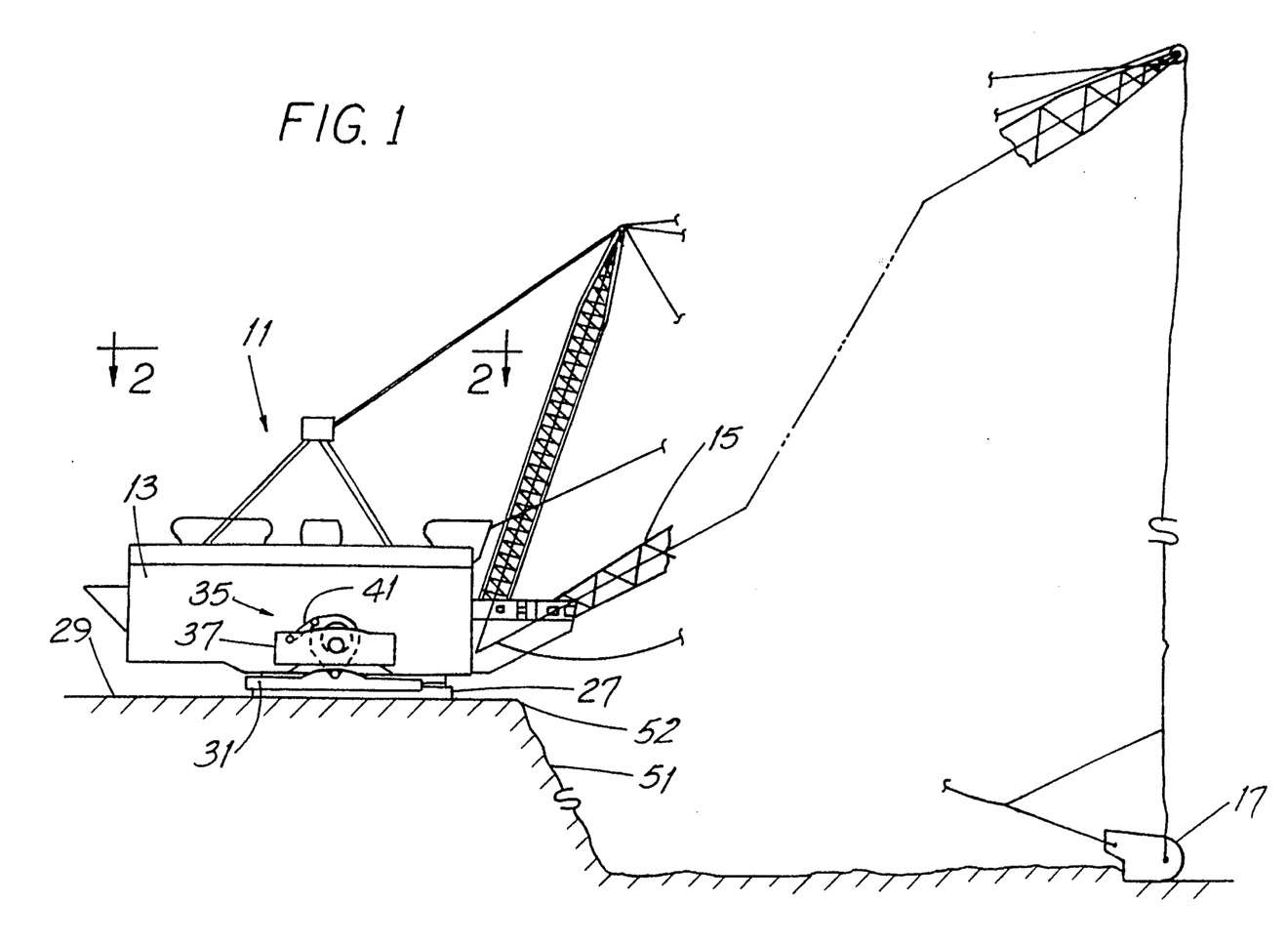
FIG. 1 is a representative side elevation view of a walking dragline.
Figure 2:
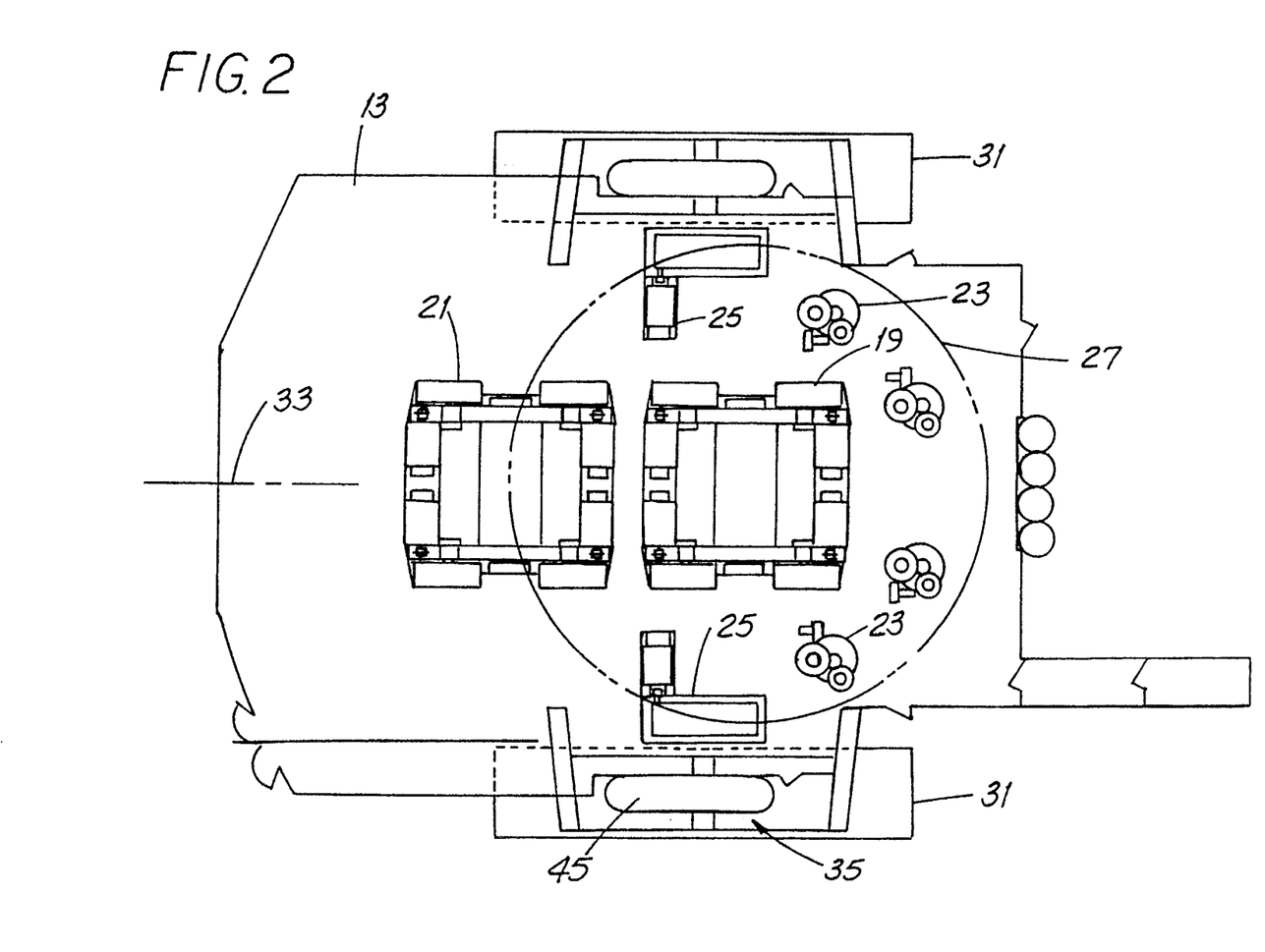
FIG. 2 is a top plan view, in phantom, of the main housing portion of the dragline of FIG. 1, taken along the viewing plane 2—2 thereof and with parts broken away.
Figure 3A:
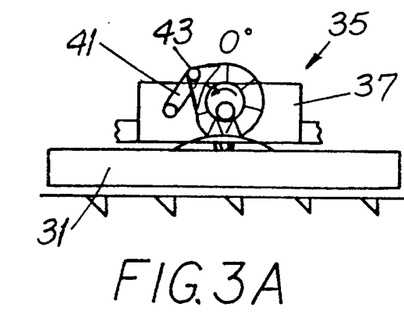
FIGS. 3A–3G show a sequence of operation of one of the walk legs of the dragline of FIG. 1.
Figure 3B:
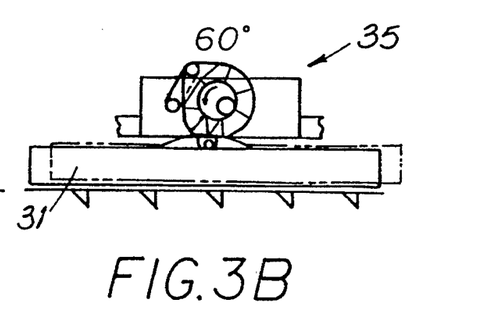
Figure 3C:
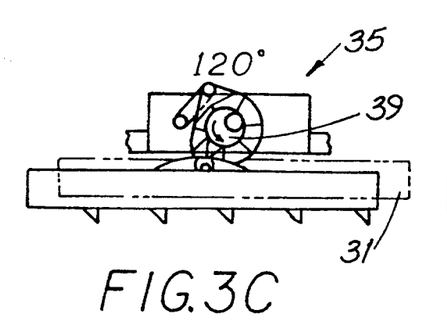
Figure 3D:
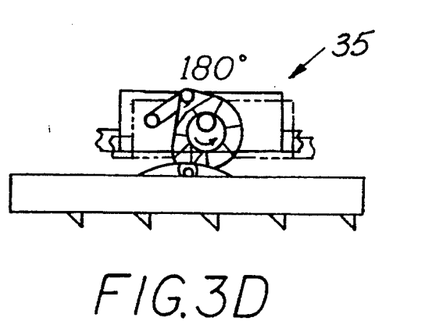
Figure 3E:
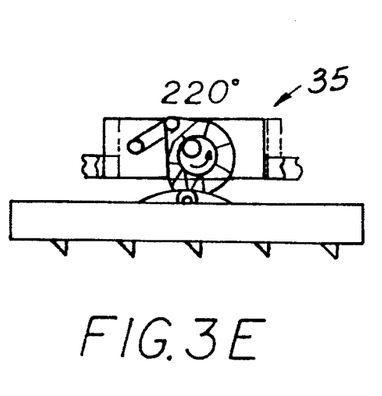
Figure 3F:
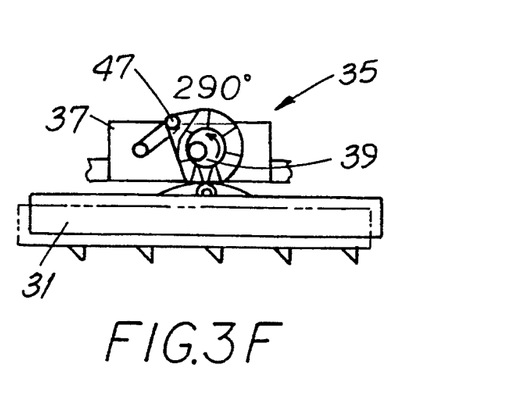
Figure 3G:
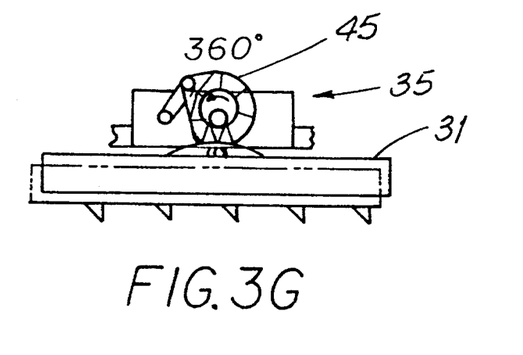

Referring first to FIGS. 1 and 2, an exemplary walking dragline 11 includes a main housing portion 13 having a boom 15 extending therefrom to support and manipulate a digging bucket 17. Within the housing portion 13 are mounted the bucket hoist, bucket drag and swing systems 19, 21 and 23, respectively. The drive 25 for the "walking" system is also mounted therein. When digging, the dragline 11 sits on and pivots about a generally circular "tub" or platform 27 which rests on the earth's surface 29.

The dragline 11 also includes a pair of pads or "shoes" 31 which, when moved in unison as described below, lift the platform 27 and move the dragline 11 rearward away from the bucket 17. Movement in the exemplary dragline 11 is in "steps" of about seven feet in length and along the long axis 33 of the main housing portion 13.

Referring additionally to FIGS. 3A–3G, a walk-like mechanism 35 typically includes a walk leg housing 37, a driven eccentric 39 and a knee link 41. The knee link 41 has its upper end 43 coupled to the eccentric housing 45 by a pin 47 to permit relative rotation of a few degrees between the link 41 and the housing 37. The lower end of the knee link 41 is similarly coupled to the nearby walk leg housing 37. As a rough analogy, the coupling at the upper end 43 of the link 41 is analogous to the human knee and the eccentric 39 is analogous to the human hip joint.

As the eccentric 39 is driven counterclockwise (in the right-side sequence of FIGS. 3A–3G) through one revolution, the shoe 31 is lowered to ground contact and the dragline 11 lifted and moved rearward. The shoe 31 is then raised until the platform 27 again rests on the surface 29.

Since the bucket 17 is drawn toward the dragline 11, removal of overburden 51 progresses toward the dragline 11 until the edge 52 of the pit becomes relatively near to the dragline 11. Therefore, the dragline 11 must occasionally be moved rearward a few feet to expose additional overburden 51 for digging.

Figure 4:
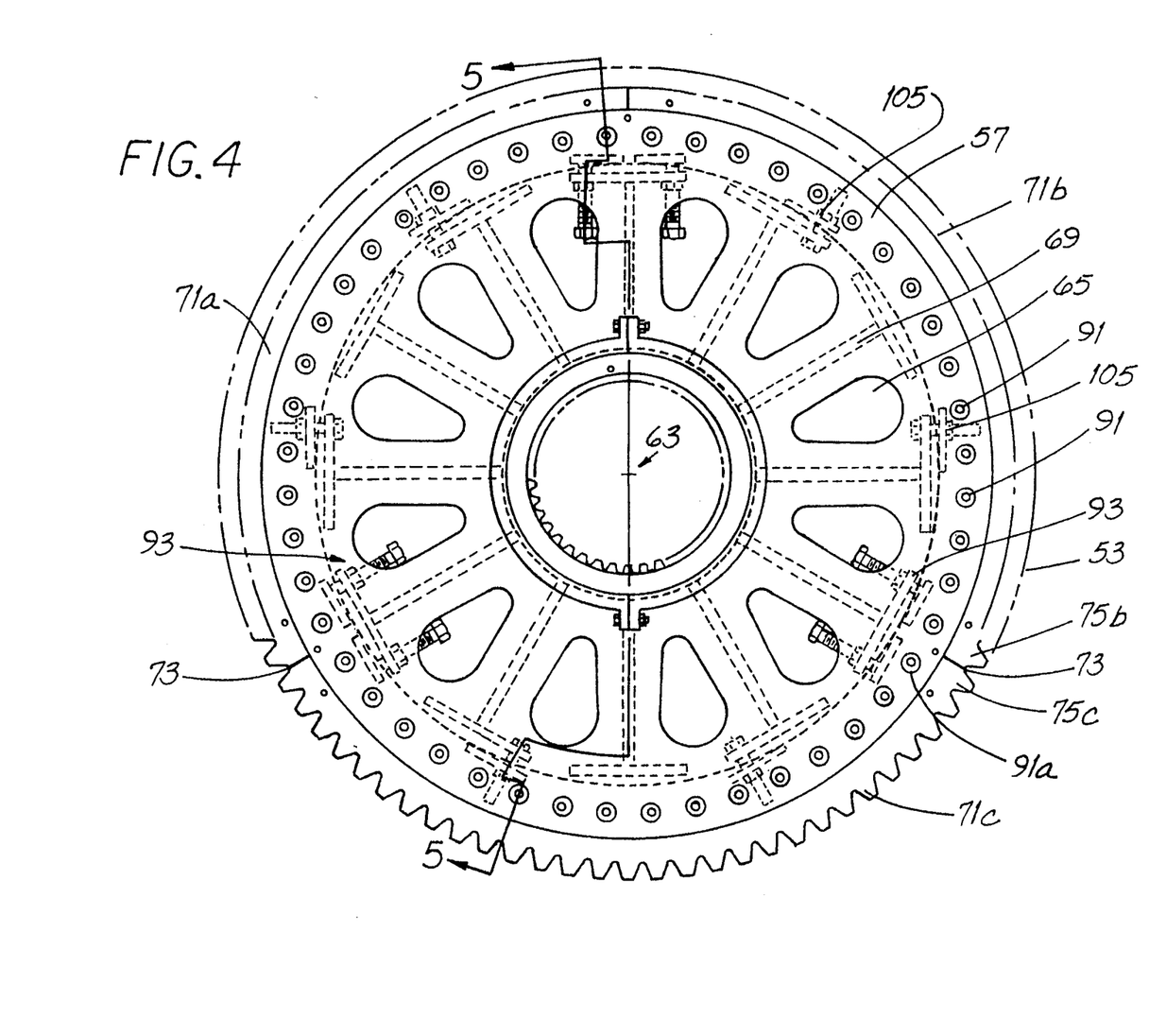
FIG. 4 is an elevation view of a gear assembly. Parts are shown in dashed outline.
Figure 5:
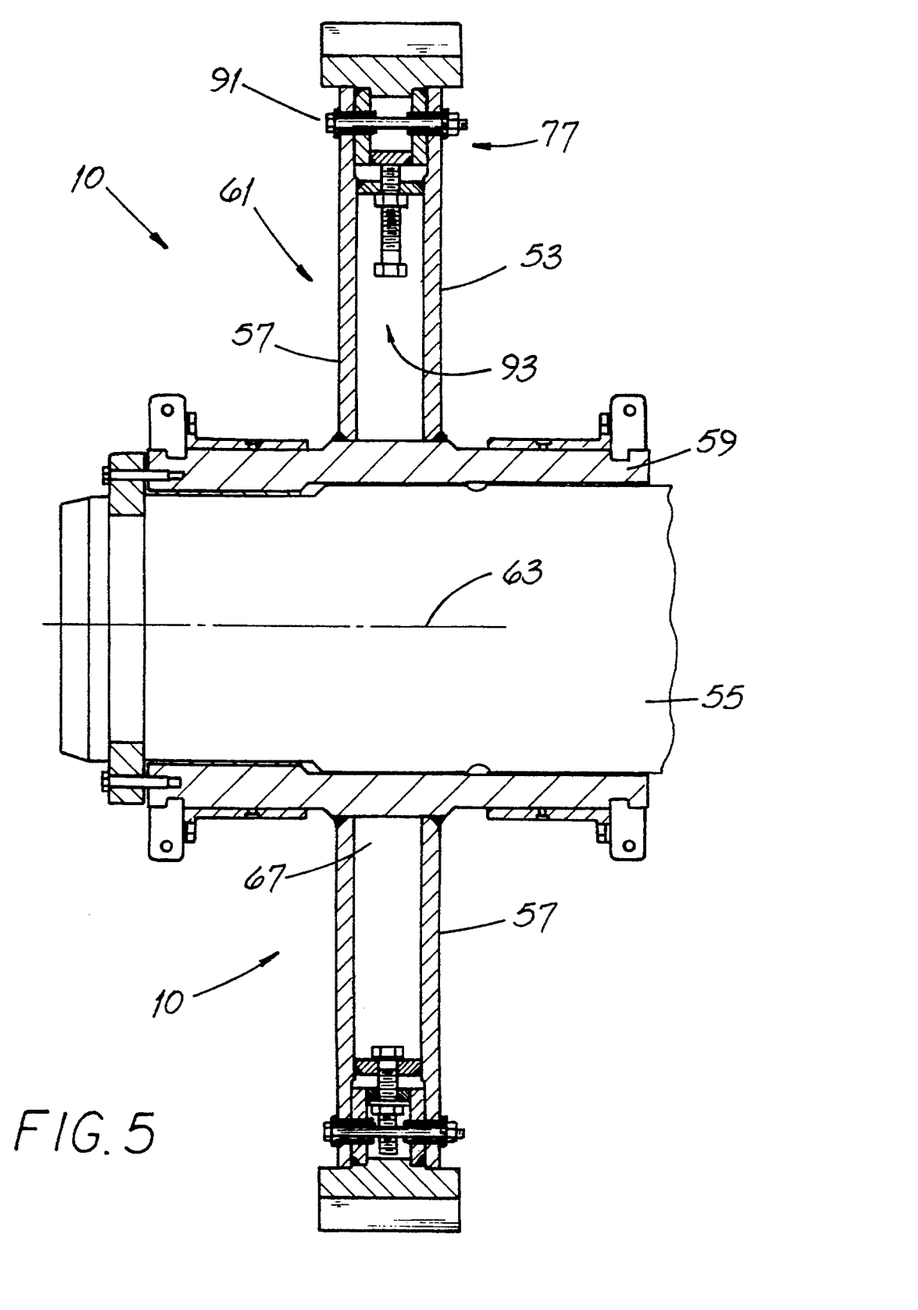
FIG. 5 is an elevation view taken along the section line 5—5 of FIG. 4 and showing the gear assembly of FIG. 4 in conjunction with a shaft driven by the assembly. Parts are in cross-section and other parts are broken away.

Referring to FIGS. 4 and 5, the invention relates to a spur-type gear assembly 53 driven by a pinion gear (not shown). The gear assembly 53 is concentric with and rotatably powers the walk leg shaft 55 which, in turn, drives the eccentric 39. In a highly preferred embodiment, the gear assembly 53 includes a pair of disc-shaped, spaced webs 57 attached to a quill 59 by welding. The webs 57 (which form the assembly spider 61) are generally flat, mutually parallel and generally normal to the axis of rotation 63. Each web 57 of the spider 61 has a plurality of tear-drop-shaped apertures 65 spaced radially around the axis 63 and equidistant from such axis 63. The apertures 65 in a web 57 are in general registry with those of the other web 57 and permit access to the space 67 between the webs 57. As will become apparent, access thereto is preferred in the exemplary embodiment. A radially-extending stiffening plate 69 is interposed between the webs 57 and is attached to each web 57. Preferably, each such plate 69 is midway between adjacent pairs of apertures 65 in a web 57.

The assembly 53 also includes a plurality of arc-shaped gear segments 71a, 71b, 71c. In a highly preferred arrangement, there are three such segments 71 extending around the circumference of the spider 61 and each segment 71 spans an arc length of about 120°. FIG. 4 shows the plane 73 at which an end 75b of a segment, e.g., end 75c of segment 71c abuts an end 75b of an adjacent segment 71b.

Each segment 71 is attached to the spider 61 by a segment mounting member 77, preferably of the type comprising a pair of arc-shaped support plates 79. Such plates 79 are attached to the segment body 81 by welding and the outer or first surface 83 of each plate 79 is spaced from the outer surface 83 of the other plate 79 by a dimension substantially equal to the spacing between the inner or second surfaces 85 of the webs 57.

For best rigidity, there is preferably no "play" between the parts making up the assembly 53. Therefore, the spacing between the plate first surfaces 83 and that between the spider second surfaces 85 are preferably cooperatively selected so that there is a friction fit between the spider 61 and the segment mounting member 77. When so fitted, force is required to slide the mounting member 77 along the surfaces 85 and urge a segment 71 away from the spider 61.

Each segment 71 and, more specifically, each segment mounting member 77 has a plurality of radially-spaced attachment holes 87 formed therein at locations generally equidistant from the axis 63. Such holes 87 are spaced equidistant from one another and are in general registry with corresponding holes 89 in the spider 61. After each segment 71 is positioned on the spider 61, fasteners 91 (bolts or the like) are inserted through the holes 87, 89 and tightened.

Figure 6:
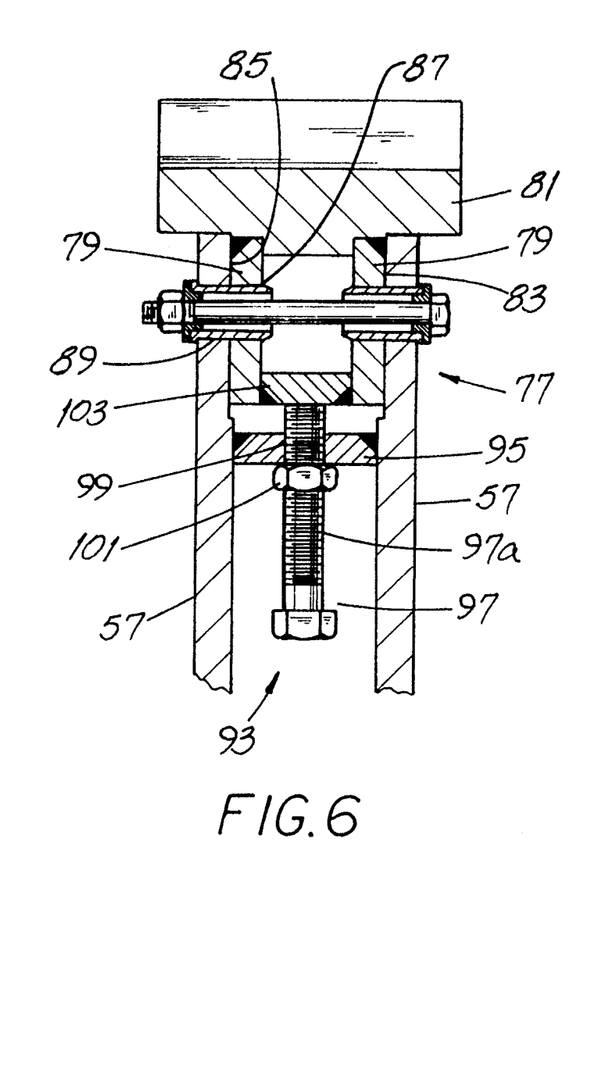
FIG. 6 is an enlarged cross-section view of the jack assembly (for removing the segment from the spider) shown in the upper portion of FIG. 5. Parts are in cross-section and other parts are broken away.

Referring now to FIGS. 5 and 6, a jack assembly 93 will now be described. Such assemblies 93 are used to disengage a segment 71 from the spider 61 when service is being performed. The jack assembly 93 includes a first force reaction member 95 such as a plate interposed between and attached by welding or the like to the webs 57 of the spider 61. In a highly preferred arrangement, each reaction member 95 is placed so that a plane 73 is about midway between the member ends as shown in FIG. 4. In that way, one need only mount one member 95 for each pair of abutting segment ends e.g., ends 75b, 75c.

Jacking means 97 such as a jacking bolt 97a or the like is threaded through a hole 99 in the member 95 at a location generally midway between the spider webs 57. A lock nut 101 secures the bolt 97a during machine operation and is loosened when the bolt 97a is rotated and moved radially outward to "jack" the segment 71 out of the spider 61 as described below. The segment mounting member 77 has a push plate 103 attached therebetween by welding. When the jacking means 97 is moved radially outward, it applies a separating force to the segment 71 and disengages the segment 71 from the spider 61 by sliding the first surface 83 along the second surface 85. The separating force is applied between the reaction member 95 and the push plate 103.

Clearly, it is not possible to disengage a segment 71 from the spider 61 without first removing the fasteners 91. The following procedure makes such disengagement easier. After loosening but before completely detaching the drawtight assemblies 105 (described below), all of the fasteners 91 are removed from the segment 71. A smaller-diameter support bolt, pin or the like (not shown) is then inserted through "matched" holes 87, 89 adjacent to an end of the segment 71. Use of a smaller diameter pin provides some "slack" between the holes 87, 89 and permits the segment 71 to be moved slightly away from the spider 61 while yet supporting the segment 71 until its weight can be taken by a lift truck or the like. The jacking bolts 97 associated with the segment 71 being removed are advanced radially outward to urge the segment 71 away from the spider 61. Once the weight of the segment 71 is supported by a lift truck or the like, the temporary pin(s) are removed.

Figure 7:
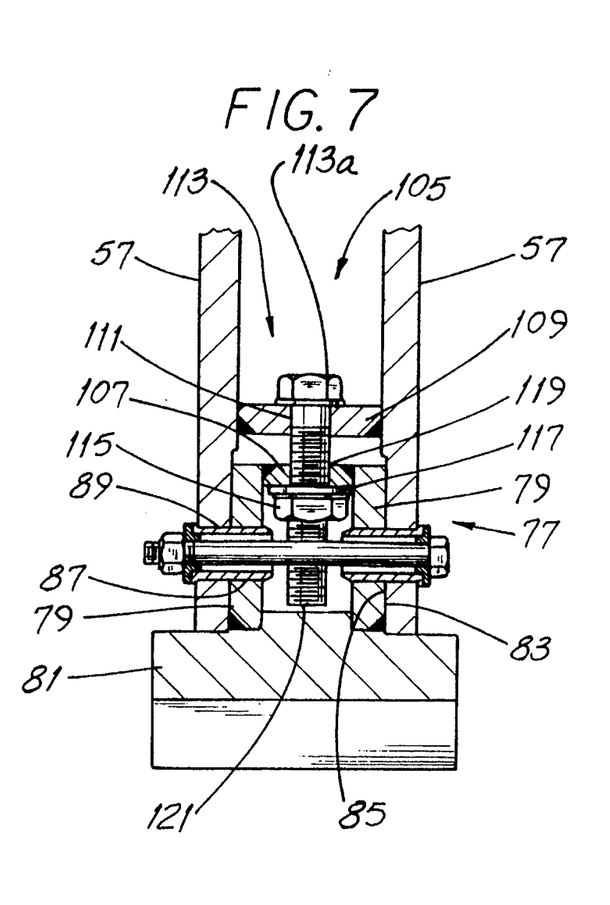
FIG. 7 is an enlarged cross-section view of the drawtight assembly (for attaching the segment to the spider) shown in the lower portion of FIG. 5. Parts are in cross-section and other parts are broken away.

Referring now to FIGS. 5 and 7, it is assumed that disengagement is for purposes of repair or replacement of the removed segment 71. Once that has been accomplished, it is necessary to re-mount the segment 71 on the spider 61. To that end, the improved apparatus 10 also includes a drawtight assembly 105 and a segment-mounted coupler 107. The drawtight assembly 105 has a draw plate 109 interposed between and attached to the webs 57 and as shown in FIG. 4, each segment 71 has two drawtight assemblies 105.

Extending through an unthreaded clearance hole 111 in the draw plate 109 is drawdown means 113 which in the preferred arrangement includes a coupling bolt 113a and a nut 115 attached to (not merely abutting) a washer 117. The coupler 107 is interposed between and attached to the segment support plates 79 and has an elliptical hole 119 therethrough to receive the coupling bolt 113a. An elliptical or other type of "out-of-round" hole 119 is preferred to provide enough clearance for the distal end 121 of the bolt 113a to pass through the coupler 107 as the segment 71 is being pivoted and brought to contact with the spider 61.

To use the drawtight assembly 105, a segment 71 is partially re-engaged to the extent necessary to permit the distal end 121 to pass through the coupler hole 119. When such end 121 is exposed, the nut 115 and washer 117 are placed between the support plates 79 and the bolt 113a threaded into the nut 115. The washer 117 (which is square, oblong or the like) has a dimension greater than the spacing between the plates 79. In that way, the bolt 113a can be threaded into the nut 115 without the nut 115 turning between the plates 79.

By turning the bolt 113a, force is applied to the coupler 107 to move the coupler 107 radially inward toward the draw plate 109, slide the surface 83 across the surface 85 and engage the segment 71 with the spider 61. Assuming the other segments 71 have remained in place on the spider 61 (and this is typically the case in field repair), that segment 71 being re-attached to the spider 61 will be "cammed" into its proper position by the wedge-like effect exerted by the segment 71 at each end 75 of that segment 71 being re-attached. As a consequence, the holes 87 in the segment 71 will be urged into registry with the holes 89 in the spider 71 and the fasteners 91 are re-inserted and tightened.

While the principles of this invention have been described in connection with specific embodiments, it should be understood clearly that these descriptions are made only by way of example and are not intended to limit the scope of the invention.

I claim:

1. An improved method for servicing a gear assembly having a gear segment and a spider for supporting the segment, the method including the steps of:
providing a jack assembly with jacking means mounted for radial movement;
moving the jacking means radially outward to apply a separating force to the segment; and,
disengaging the segment from the spider.

2. The method of claim 1 wherein the jack assembly includes a first force reaction member and the separating force is applied between the reaction member and the segment.

3. The method of claim 2 wherein the segment includes a push plate and the separating force is applied between the reaction member and the push plate.

4. The method of claim 1 wherein the segment has a first surface, the spider has a second surface and the disengaging step includes disengaging the surfaces from one another.

5. The method of claim 4 wherein the surfaces are disengaged from one another by sliding the first surface along the second surface.

6. The method of claim 1 wherein the jacking means includes a jacking bolt and the moving step includes rotating the bolt to move the bolt radially outward.

7. The method of claim 1 further including the steps of:
providing a drawtight assembly with a coupler attached to the segment;
applying a force to the coupler;
moving the coupler radially inward; and,
engaging the segment with the spider.

8. The method of claim 7 wherein the drawtight assembly includes a draw plate and the force is applied to urge the coupler toward the draw plate.

9. The method of claim 8 wherein the segment has a segment mounting member, the spider has a surface and the engaging step includes sliding the mounting member along the surface.

10. The method of claim 7 wherein the drawtight assembly includes a coupling bolt and the moving step includes rotating the coupling bolt to move the segment radially inward.

11. The method of claim 1 wherein:
the segment is arc-shaped and has ends;
the segment is attached to the spider by a plurality of fasteners spaced along the length of the segment,
and the method includes, in either order with respect to the providing step, the step of:
removing all but a single fastener from the segment, the single remaining fastener being adjacent to a segment end,
and the disengaging step is preceded by the step of:
pivoting the segment about the single remaining fastener.

12. In a gear assembly having a gear segment and a spider for supporting the segment, the improvement comprising:
a segment-attached mounting member;
a spider-mounted jack assembly with jacking means mounted for radial movement to engage the mounting member and apply radial force thereto,
whereby the segment may be disengaged from the spider.

13. The assembly of claim 12 wherein:
the mounting member includes spaced support plates;
the spider includes spaced webs, each web abutting a separate support plate;
a push plate is attached to the support plates and engaged by the jacking means for disengaging the segment from the spider.

14. In a gear assembly having a gear segment and a spider for supporting the segment, the improvement comprising:
a segment-mounted coupler;
a spider-mounted drawtight assembly including drawdown means to engage the coupler and apply radial force thereto,
whereby the segment may be engaged with the spider.

15. The assembly of claim 14 wherein:
the segment includes spaced support plates;
the coupler is attached to the support plates;
the spider includes spaced webs and each web abuts a separate support plate;
the drawdown means includes a drawdown bolt rotated to move the segment radially inward.

* * * * *